United States Patent
Choi et al.

(10) Patent No.: US 12,177,812 B2
(45) Date of Patent: Dec. 24, 2024

(54) TECHNIQUES FOR SELECTING RESOURCES FROM RESOURCE MAPS OBTAINED FROM NEARBY DEVICES

(71) Applicant: QUALCOMM Incorporated, San Diego, CA (US)

(72) Inventors: Chang-Sik Choi, Seoul (KR); Kapil Gulati, Belle Mead, NJ (US); Sudhir Kumar Baghel, Hillsborough, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 17/249,235

(22) Filed: Feb. 24, 2021

(65) Prior Publication Data

US 2021/0274471 A1    Sep. 2, 2021

Related U.S. Application Data

(60) Provisional application No. 62/983,430, filed on Feb. 28, 2020.

(51) Int. Cl.
*H04W 72/02* (2009.01)
*H04W 72/0446* (2023.01)
*H04W 72/51* (2023.01)

(52) U.S. Cl.
CPC ....... *H04W 72/02* (2013.01); *H04W 72/0446* (2013.01); *H04W 72/51* (2023.01)

(58) Field of Classification Search
CPC .. H04W 72/02; H04W 72/51; H04W 72/0446
See application file for complete search history.

(56) References Cited

U.S. PATENT DOCUMENTS

| | | | | |
|---|---|---|---|---|
| 10,278,158 | B2* | 4/2019 | Rudolf | H04W 72/04 |
| 11,178,693 | B2* | 11/2021 | Zhang | H04W 74/004 |
| 2008/0273606 | A1* | 11/2008 | Orfanos | H04L 5/0098 |
| | | | | 375/260 |
| 2011/0194503 | A1* | 8/2011 | Stanforth | H04W 16/14 |
| | | | | 370/329 |

(Continued)

FOREIGN PATENT DOCUMENTS

WO    2006000955 A1    1/2006

OTHER PUBLICATIONS

"Summary#2 for AI 7.2.4.2.2 Mode-2 Resource Allocation"; Intel Corporation; 3GPP TSG RAN WG1 Meeting #99 R1-1913450 Reno, Nevada, USA, Nov. 18-22, 2019 (Year: 2019).*

(Continued)

*Primary Examiner* — Benjamin H Elliott, IV
(74) *Attorney, Agent, or Firm* — Dalei Dong; Harrity & Harrity, LL

(57) ABSTRACT

Various aspects of the present disclosure generally relate to wireless communication. In some aspects, a first user equipment (UE) may receive a set of resource maps from one or more second UEs, each resource map of the set of resource maps including resource availability information for a respective time window. The first UE may select a set of resources based at least in part on at least one resource map of the set of resource maps. The first UE may transmit a signal using the selected set of resources. Numerous other aspects are provided.

28 Claims, 6 Drawing Sheets

(56) References Cited

U.S. PATENT DOCUMENTS

| | | | | |
|---|---|---|---|---|
| 2011/0312281 | A1* | 12/2011 | Xiao | H04W 24/10 |
| | | | | 455/67.11 |
| 2015/0359039 | A1* | 12/2015 | Haque | G06F 16/95 |
| | | | | 702/188 |
| 2016/0007368 | A1* | 1/2016 | Moon | H04W 56/00 |
| | | | | 370/329 |
| 2017/0013596 | A1* | 1/2017 | van Phan | H04W 74/0816 |
| 2017/0034685 | A1* | 2/2017 | Jiang | H04W 74/0816 |
| 2017/0318551 | A1* | 11/2017 | Yasukawa | H04W 8/005 |
| 2019/0223158 | A1* | 7/2019 | Gao | H04W 68/005 |
| 2020/0145798 | A1* | 5/2020 | Kim | H04W 76/14 |
| 2020/0280398 | A1* | 9/2020 | Hwang | H04L 5/0078 |
| 2020/0305191 | A1* | 9/2020 | Moon | H04W 72/23 |
| 2021/0045093 | A1* | 2/2021 | Rao | H04W 72/04 |
| 2021/0227602 | A1* | 7/2021 | Li | H04W 72/0446 |
| 2021/0258955 | A1* | 8/2021 | Zhou | H04W 72/51 |
| 2021/0274471 | A1* | 9/2021 | Choi | H04W 72/51 |
| 2022/0232522 | A1* | 7/2022 | Reial | H04W 72/23 |
| 2023/0066174 | A1* | 3/2023 | Xu | H04W 74/0808 |

OTHER PUBLICATIONS

"Resource Allocation for Mode 2"; Apple; 3GPP TSG RAN WG1 #99 R1-1912812 Reno, USA, Nov. 18-22, 2019 (Year: 2019).*
"Discussion on resource allocation mechanism for sidelink Mode 2 in NR V2X"; CATT; 3GPP TSG RAN WG1 #99 R1-1912155 Reno, USA, Nov. 18-22, 2019 (Year: 2019).*
International Search Report and Written Opinion—PCT/US2021/019527—ISA/EPO—Jun. 23, 2021.

* cited by examiner

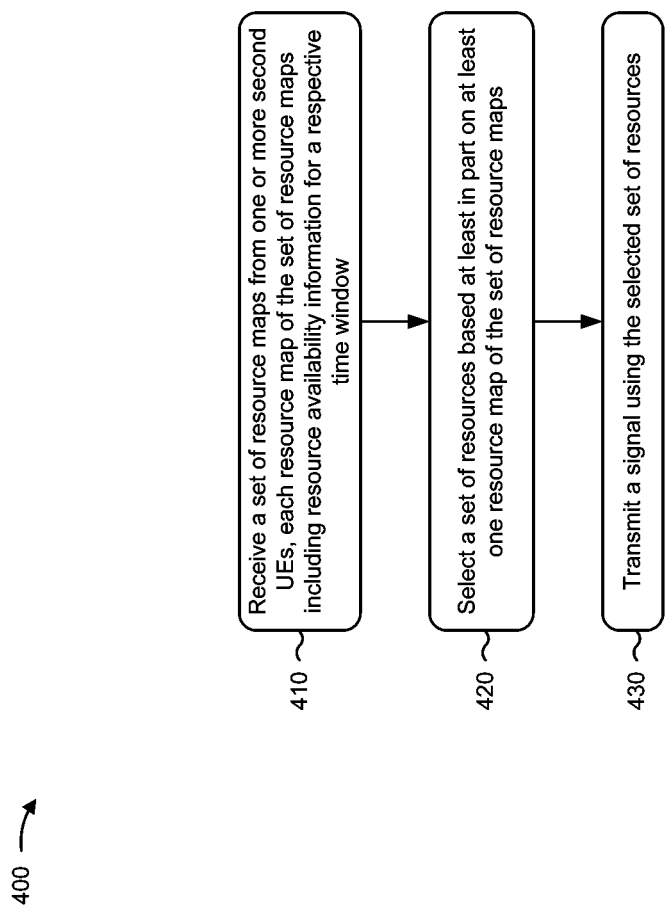

TECHNIQUES FOR SELECTING RESOURCES FROM RESOURCE MAPS OBTAINED FROM NEARBY DEVICES

CROSS-REFERENCE TO RELATED APPLICATION

This Patent Application claims priority to U.S. Provisional Patent Application No. 62/983,430, filed on Feb. 28, 2020, entitled "TECHNIQUES FOR SELECTING RESOURCES FROM RESOURCE MAPS OBTAINED FROM NEARBY DEVICES," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for selecting resources from resource maps obtained from nearby devices.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving a set of resource maps from one or more second UEs, each resource map of the set of resource maps including resource availability information for a respective time window; selecting a set of resources based at least in part on at least one resource map of the set of resource maps; and transmitting a signal using the selected set of resources.

In some aspects, the selection of the set of resources is further based at least in part on a transmission time threshold.

In some aspects, the method includes receiving a request to transmit the signal, the request indicating that the signal is to be transmitted in accordance with a transmission time threshold.

In some aspects, the at least one resource map of the set of resource maps includes information that identifies available resources.

In some aspects, selecting the set of resources comprises: determining that no resource map has been received within a threshold amount of time from receipt of a freshest resource map of the set of resource maps; determining that a receipt time of a request to transmit the signal is after an end of a time window associated with the freshest resource map; and randomly selecting the set of resources based at least in part on the determination that no resource map has been received within the threshold amount of time and the determination that the receipt time of the request is after the end of the time window associated with the freshest resource map.

In some aspects, selecting the set of resources comprises: identifying a particular resource map, of the set of resource maps, associated with a time window having: a latest start time that is before a receipt time of a request to transmit the signal, and an end time that is after the receipt time of the request; and selecting the set of resources based at least in part on the particular resource map.

In some aspects, the set of resource maps includes a plurality of resource maps, the method further comprises: combining the plurality of resource maps to generate a combined resource map, the combined resource map identifying available resources.

In some aspects, selecting the set of resources comprises: determining that a transmission time threshold is before an end time associated with the combined resource map; and selecting the set of resources based at least in part on the combined resource map.

In some aspects, selecting the set of resources comprises: determining that a transmission time threshold is after an end time associated with the combined resource map; and selecting at least a subset of the resources, of the set of resources, from the combined resource map based at least in part on the determination that the transmission time threshold is after the end time associated with the combined resource map.

In some aspects, selecting the set of resources further comprises: randomly selecting another subset of resources, of the set of resources, based at least in part on the determination that the transmission time threshold is after the end time associated with the combined resource map.

In some aspects, at least one resource map of the set of resource maps includes information that identifies unavailable resources.

In some aspects, selecting the set of resources comprises: determining that a receipt time of a request to transmit the signal is after an end of a time window of a freshest resource map of the set of resource maps; and randomly selecting the set of resources based at least in part on the determination that the receipt time of the request is after the end of the time window of the freshest resource map.

In some aspects, the set of resource maps includes a plurality of resource maps, selecting the set of resources comprises: combining the plurality of resource maps to generate a combined resource map that identifies unavailable resources; determining that a transmission time threshold is before an end time associated with the combined resource map; and randomly selecting the set of resources based at least in part on the combined resource map.

In some aspects, each resource map of the set of resource maps includes location information associated with a UE of the one or more second UEs.

In some aspects, the set of resource maps identify available resources, and selecting the set of resources comprises: identifying, based at least in part on the location information, a closest UE of the one or more second UEs; identifying a freshest resource map, of the set of resource maps, associated with the closest UE; and selecting the set of resources based at least in part on the freshest resource map associated with the closest UE.

In some aspects, the set of resource maps identify available resources, and selecting the set of resources comprises: identifying, based at least in part on the location information, a closest UE of the one or more second UEs; identifying a subset of resource maps, of the set of resource maps, associated with the closest UE; combining the subset of resource maps to generate a combined resource map associated with the closest UE; and selecting the set of resources based at least in part on the combined resource map associated with the closest UE.

In some aspects, the set of resource maps identify unavailable resources, and selecting the set of resources comprises: combining the set of resource maps to generate a combined resource map; identifying available resources from the combined resource map; and selecting the set of resources based at least in part on the combined resource map.

In some aspects, the set of resource maps identify unavailable resources, and selecting the set of resources comprises: identifying a freshest resource map of the set of resource maps; identifying available resources based at least in part on the freshest resource map; and selecting the set of resources from the identified available resources.

In some aspects, the set of resources is selected further based at least in part on sensing performed by the first UE.

In some aspects, a first UE for wireless communication includes a memory; and one or more processors coupled to the memory, the memory and the one or more processors configured to: receive a set of resource maps from one or more second UEs, each resource map of the set of resource maps including resource availability information for a respective time window; select a set of resources based at least in part on at least one resource map of the set of resource maps; and transmit a signal using the selected set of resources.

In some aspects, the selection of the set of resources is further based at least in part on a transmission time threshold.

In some aspects, the memory and the one or more processors are further configured to receive a request to transmit the signal, the request indicating that the signal is to be transmitted in accordance with a transmission time threshold.

In some aspects, the at least one resource map of the set of resource maps includes information that identifies available resources.

In some aspects, the memory and the one or more processors, when selecting the set of resources, are configured to: determine that no resource map has been received within a threshold amount of time from receipt of a freshest resource map of the set of resource maps; determine that a receipt time of a request to transmit the signal is after an end of a time window associated with the freshest resource map; and randomly select the set of resources based at least in part on the determination that no resource map has been received within the threshold amount of time and the determination that the receipt time of the request is after the end of the time window associated with the freshest resource map.

In some aspects, the memory and the one or more processors, when selecting the set of resources, are configured to: identify a particular resource map, of the set of resource maps, associated with a time window having: a latest start time that is before a receipt time of a request to transmit the signal, and an end time that is after the receipt time of the request; and select the set of resources based at least in part on the particular resource map.

In some aspects, the set of resource maps includes a plurality of resource maps, the memory and the one or more processors are further configured to: combine the plurality of resource maps to generate a combined resource map, the combined resource map identifying available resources.

In some aspects, the memory and the one or more processors, when selecting the set of resources, are configured to: determine that a transmission time threshold is before an end time associated with the combined resource map; and select the set of resources based at least in part on the combined resource map.

In some aspects, the memory and the one or more processors, when selecting the set of resources, are configured to: determine that a transmission time threshold is after an end time associated with the combined resource map; and select at least a subset of the resources, of the set of resources, from the combined resource map based at least in part on the determination that the transmission time threshold is after the end time associated with the combined resource map.

In some aspects, the memory and the one or more processors are further configured to: randomly select another subset of resources, of the set of resources, based at least in part on the determination that the transmission time threshold is after the end time associated with the combined resource map.

In some aspects, at least one resource map of the set of resource maps includes information that identifies unavailable resources.

In some aspects, the memory and the one or more processors, when selecting the set of resources, are configured to: determine that a receipt time of a request to transmit the signal is after an end of a time window of a freshest resource map of the set of resource maps; and randomly select the set of resources based at least in part on the determination that the receipt time of the request is after the end of the time window of the freshest resource map.

In some aspects, the set of resource maps includes a plurality of resource maps, the memory and the one or more processors, when selecting the set of resources, are configured to: combine the plurality of resource maps to generate a combined resource map that identifies unavailable resources; determine that a transmission time threshold is before an end time associated with the combined resource map; and randomly select the set of resources based at least in part on the combined resource map.

In some aspects, each resource map of the set of resource maps includes location information associated with a UE of the one or more second UEs.

In some aspects, the set of resource maps identify available resources, and the memory and the one or more processors, when selecting the set of resources, are configured to: identify, based at least in part on the location information, a closest UE of the one or more second UEs; identify a freshest resource map, of the set of resource maps, associated with the closest UE; and select the set of resources based at least in part on the freshest resource map associated with the closest UE.

In some aspects, the set of resource maps identify available resources, and the memory and the one or more processors, when selecting the set of resources, are configured to: identify, based at least in part on the location information, a closest UE of the one or more second UEs; identify a subset of resource maps, of the set of resource maps, associated with the closest UE; combine the subset of resource maps to generate a combined resource map associated with the closest UE; and select the set of resources based at least in part on the combined resource map associated with the closest UE.

In some aspects, the set of resource maps identify unavailable resources, and the memory and the one or more processors, when selecting the set of resources, are configured to: combine the set of resource maps to generate a combined resource map; identify available resources from the combined resource map; and select the set of resources based at least in part on the combined resource map.

In some aspects, the set of resource maps identify unavailable resources, and the memory and the one or more processors, when selecting the set of resources, are configured to: identify a freshest resource map of the set of resource maps; identify available resources based at least in part on the freshest resource map; and select the set of resources from the identified available resources.

In some aspects, the set of resources is selected further based at least in part on sensing performed by the first UE.

In some aspects, a non-transitory computer-readable medium storing one or more instructions for wireless communication includes one or more instructions that, when executed by one or more processors of a first UE, cause the one or more processors to: receive a set of resource maps from one or more second UEs, each resource map of the set of resource maps including resource availability information for a respective time window; select a set of resources based at least in part on at least one resource map of the set of resource maps; and transmit a signal using the selected set of resources.

In some aspects, the selection of the set of resources is further based at least in part on a transmission time threshold.

In some aspects, the one or more instructions, when executed by the one or more processors of the first UE, further cause the one or more processors to receive a request to transmit the signal, the request indicating that the signal is to be transmitted in accordance with a transmission time threshold.

In some aspects, the at least one resource map of the set of resource maps includes information that identifies available resources.

In some aspects, the one or more instructions, when causing the one or more processors to select the set of resources, cause the one or more processors to: determine that no resource map has been received within a threshold amount of time from receipt of a freshest resource map of the set of resource maps; determine that a receipt time of a request to transmit the signal is after an end of a time window associated with the freshest resource map; and randomly select the set of resources based at least in part on the determination that no resource map has been received within the threshold amount of time and the determination that the receipt time of the request is after the end of the time window associated with the freshest resource map.

In some aspects, the one or more instructions, when causing the one or more processors to select the set of resources, cause the one or more processors to: identify a particular resource map, of the set of resource maps, associated with a time window having: a latest start time that is before a receipt time of a request to transmit the signal, and an end time that is after the receipt time of the request; and select the set of resources based at least in part on the particular resource map.

In some aspects, the set of resource maps includes a plurality of resource maps, the one or more instructions, when executed by the one or more processors, further cause the one or more processors to: combine the plurality of resource maps to generate a combined resource map, the combined resource map identifying available resources.

In some aspects, the one or more instructions, when causing the one or more processors to select the set of resources, cause the one or more processors to: determine that a transmission time threshold is before an end time associated with the combined resource map; and select the set of resources based at least in part on the combined resource map.

In some aspects, the one or more instructions, when causing the one or more processors to select the set of resources, cause the one or more processors to: determine that a transmission time threshold is after an end time associated with the combined resource map; and select at least a subset of the resources, of the set of resources, from the combined resource map based at least in part on the determination that the transmission time threshold is after the end time associated with the combined resource map.

In some aspects, the one or more instructions, when causing the one or more processors to select the set of resources, cause the one or more processors to: randomly select another subset of resources, of the set of resources, based at least in part on the determination that the transmission time threshold is after the end time associated with the combined resource map.

In some aspects, at least one resource map of the set of resource maps includes information that identifies unavailable resources.

In some aspects, the one or more instructions, when causing the one or more processors to select the set of resources, cause the one or more processors to: determine that a receipt time of a request to transmit the signal is after an end of a time window of a freshest resource map of the set of resource maps; and randomly select the set of resources based at least in part on the determination that the receipt time of the request is after the end of the time window of the freshest resource map.

In some aspects, the set of resource maps includes a plurality of resource maps, the one or more instructions, when causing the one or more processors to select the set of resources, cause the one or more processors to: combine the plurality of resource maps to generate a combined resource map that identifies unavailable resources; determine that a transmission time threshold is before an end time associated with the combined resource map; and randomly select the set of resources based at least in part on the combined resource map.

In some aspects, each resource map of the set of resource maps includes location information associated with a UE of the one or more second UEs.

In some aspects, the set of resource maps identify available resources, and the one or more instructions, when causing the one or more processors to select the set of resources, cause the one or more processors to: identify, based at least in part on the location information, a closest UE of the one or more second UEs; identify a freshest resource map, of the set of resource maps, associated with the closest UE; and select the set of resources based at least in part on the freshest resource map associated with the closest UE.

In some aspects, the set of resource maps identify available resources, and the one or more instructions, when causing the one or more processors to select the set of resources, cause the one or more processors to: identify, based at least in part on the location information, a closest UE of the one or more second UEs; identify a subset of resource maps, of the set of resource maps, associated with the closest UE; combine the subset of resource maps to generate a combined resource map associated with the closest UE; and select the set of resources based at least in part on the combined resource map associated with the closest UE.

In some aspects, the set of resource maps identify unavailable resources, and the one or more instructions, when causing the one or more processors to select the set of resources, cause the one or more processors to: combine the set of resource maps to generate a combined resource map; identify available resources from the combined resource map; and select the set of resources based at least in part on the combined resource map.

In some aspects, the set of resource maps identify unavailable resources, and the one or more instructions, when causing the one or more processors to select the set of resources, cause the one or more processors to: identify a freshest resource map of the set of resource maps; identify available resources based at least in part on the freshest resource map; and select the set of resources from the identified available resources.

In some aspects, the set of resources is selected further based at least in part on sensing performed by the first UE.

In some aspects, an apparatus for wireless communication includes means for receiving a set of resource maps from one or more user equipments (UEs), each resource map of the set of resource maps including resource availability information for a respective time window; means for selecting a set of resources based at least in part on at least one resource map of the set of resource maps and a transmission time threshold; and means for transmitting a signal using the selected set of resources.

In some aspects, the selection of the set of resources is further based at least in part on a transmission time threshold.

In some aspects, the apparatus includes means for receiving a request to transmit the signal, the request indicating that the signal is to be transmitted in accordance with a transmission time threshold.

In some aspects, the at least one resource map of the set of resource maps includes information that identifies available resources.

In some aspects, the means for selecting the set of resources comprises: means for determining that no resource map has been received within a threshold amount of time from receipt of a freshest resource map of the set of resource maps; means for determining that a receipt time of a request to transmit the signal is after an end of a time window associated with the freshest resource map; and means for randomly selecting the set of resources based at least in part on the determination that no resource map has been received within the threshold amount of time and the determination that the receipt time of the request is after the end of the time window associated with the freshest resource map.

In some aspects, the means for selecting the set of resources comprises: means for identifying a particular resource map, of the set of resource maps, associated with a time window having: a latest start time that is before a receipt time of a request to transmit the signal, and an end time that is after the receipt time of the request; and means for selecting the set of resources based at least in part on the particular resource map.

In some aspects, the set of resource maps includes a plurality of resource maps, the apparatus further comprises: means for combining the plurality of resource maps to generate a combined resource map, the combined resource map identifying available resources.

In some aspects, the means for selecting the set of resources comprises: means for determining that a transmission time threshold is before an end time associated with the combined resource map; and means for selecting the set of resources based at least in part on the combined resource map.

In some aspects, the means for selecting the set of resources comprises: means for determining that a transmission time threshold is after an end time associated with the combined resource map; and means for selecting at least a subset of the resources, of the set of resources, from the combined resource map based at least in part on the determination that the transmission time threshold is after the end time associated with the combined resource map.

In some aspects, the means for selecting the set of resources further comprises: means for randomly selecting another subset of resources, of the set of resources, based at least in part on the determination that the transmission time threshold is after the end time associated with the combined resource map.

In some aspects, at least one resource map of the set of resource maps includes information that identifies unavailable resources.

In some aspects, the means for selecting the set of resources comprises: means for determining that a receipt time of a request to transmit the signal is after an end of a time window of a freshest resource map of the set of resource maps; and means for randomly selecting the set of resources based at least in part on the determination that the receipt time of the request is after the end of the time window of the freshest resource map.

In some aspects, the set of resource maps includes a plurality of resource maps, the means for selecting the set of resources comprises: means for combining the plurality of resource maps to generate a combined resource map that identifies unavailable resources; means for determining that a transmission time threshold is before an end time associated with the combined resource map; and means for randomly selecting the set of resources based at least in part on the combined resource map.

In some aspects, each resource map of the set of resource maps includes location information associated with a UE of the one or more UEs.

In some aspects, the set of resource maps identify available resources, and the means for selecting the set of resources comprises: means for identifying, based at least in part on the location information, a closest UE of the one or more UEs; means for identifying a freshest resource map, of the set of resource maps, associated with the closest UE; and means for selecting the set of resources based at least in part on the freshest resource map associated with the closest UE.

In some aspects, the set of resource maps identify available resources, and the means for selecting the set of resources comprises: means for identifying, based at least in part on the location information, a closest UE of the one or more UEs; means for identifying a subset of resource maps, of the set of resource maps, associated with the closest UE; means for combining the subset of resource maps to generate a combined resource map associated with the closest UE; and means for selecting the set of resources based at least in part on the combined resource map associated with the closest UE.

In some aspects, the set of resource maps identify unavailable resources, and the means for selecting the set of resources comprises: means for combining the set of resource maps to generate a combined resource map; means for identifying available resources from the combined resource map; and means for selecting the set of resources based at least in part on the combined resource map.

In some aspects, the set of resource maps identify unavailable resources, and the means for selecting the set of resources comprises: means for identifying a freshest resource map of the set of resource maps; means for identifying available resources based at least in part on the freshest resource map; and means for selecting the set of resources from the identified available resources.

In some aspects, the set of resources is selected further based at least in part on sensing performed by the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example process performed, for example, by a user equipment, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
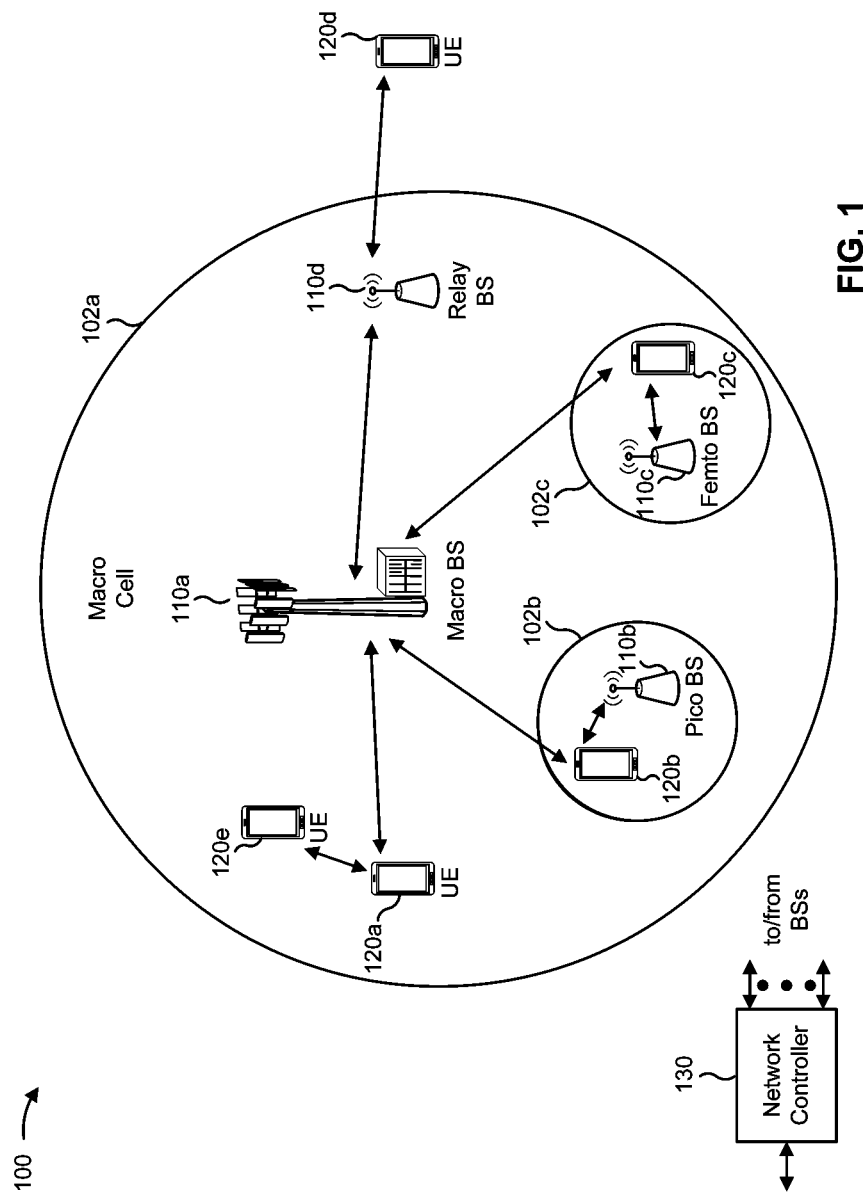
FIG. 1 is a diagram illustrating an example of a wireless communication network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHZ, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHZ, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHZ). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHZ). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
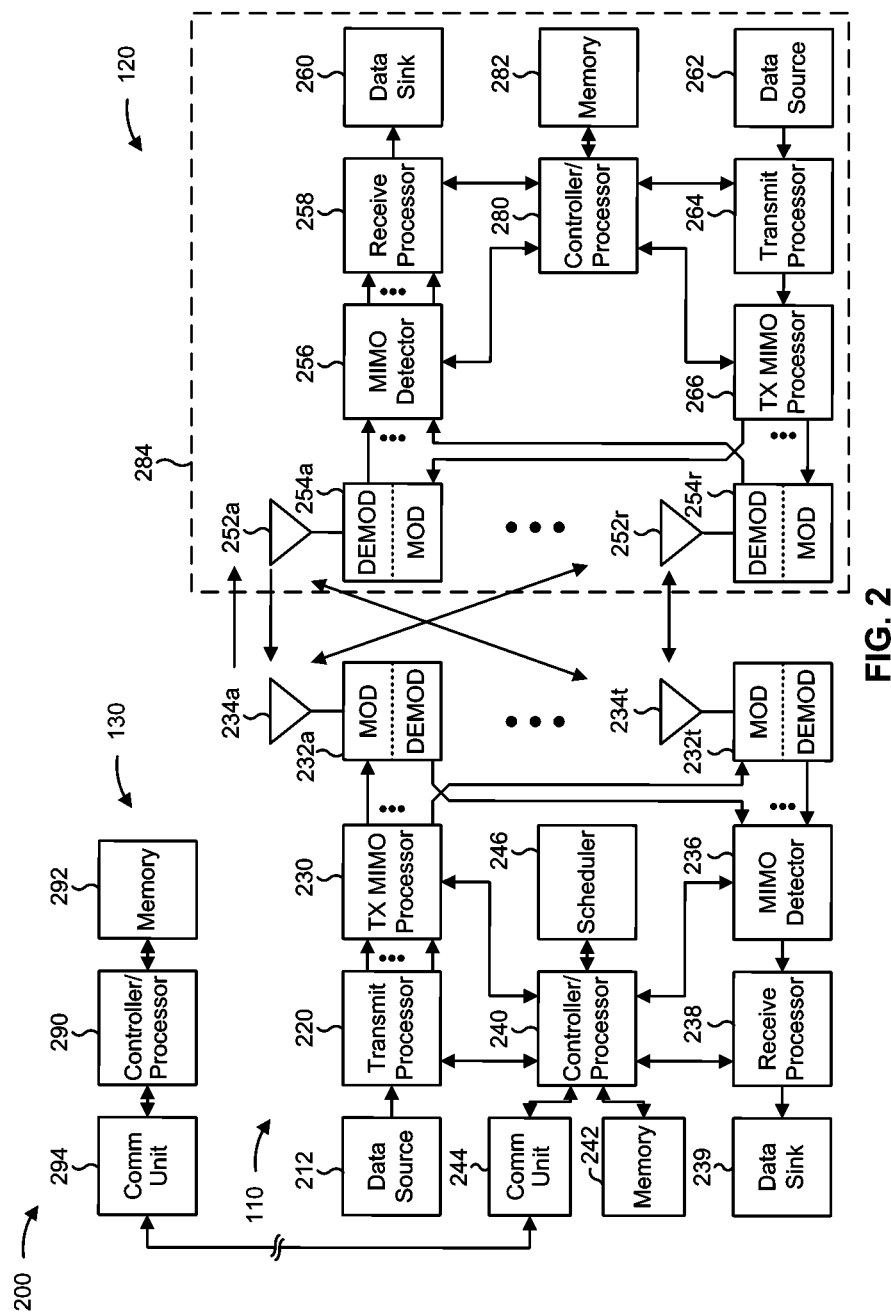
FIG. 2 is a diagram illustrating an example of a base station in communication with a UE in a wireless communication network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with selecting resources from resource maps obtained from nearby devices, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4 and/or other processes as described herein. In some aspects, executing instructions may include running the instructions, converting the instructions, compiling the instructions, and/or interpreting the instructions.

In some aspects, a first UE 120 may include means for receiving a set of resource maps from one or more second UEs 120, each resource map of the set of resource maps including resource availability information for a respective time window; means for selecting a set of resources based at least in part on at least one resource map of the set of resource maps; means for transmitting a signal using the selected set of resources; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In a wireless communication system, such as an NR system, a wireless communication device, such as a UE, may determine a resource map that identifies one or more resources that are available to be used for transmitting a signal in a particular time window (herein referred to as available resources) and/or one or more resources that are not available to be used for transmitting a signal in the particular time window (herein referred to as unavailable resources). For example, the UE may determine the resource map based at least in part on sensing performed by the UE, based at least in part on control information received by the UE (e.g., by decoding resource reservations carried in a control channel), based at least in part on identifying repetitive transmissions by other wireless communication devices, based at least in part on another resource map received by the UE, and/or the like.

In some cases, a resource map determined by one or more UEs can be shared with one or more other UEs. For example, a first UE may determine a first resource map based on sensing performed by the first UE and control information received by the first UE, and the first UE may provide (e.g., via a control channel) the first resource map to one or more other UEs including a second UE. In one example, the second UE may use the first resource map in association with identifying available resources for transmitting a signal. In another example, the second UE may determine a second resource map based on the first resource map and sensing performed by the second UE. Here, the second UE may use the second resource map in association with identifying available resources for transmitting a signal. Further, in some cases, the second UE may provide the second resource map to one or more other UEs. Resource map sharing is useful in, for example, a distributed system (e.g., to address a hidden node problem or a half-duplex limitation).

In some deployments, a first UE may determine (e.g., based on initial measurements and decoding first control information) a first resource map and provide the first resource map to a second UE. Next, sometime after determining the first resource map, the first UE may determine (e.g., based on subsequent measurements and decoding second control information) a second resource map and provide the second resource map to the second UE. In this example, a third UE may determine a third resource map and provide the third resource map to the second UE. Thus, the second UE may receive multiple, possibly overlapping, resource maps from one or more other UEs. A manner in which such a UE processes a set of resource maps received from one or more other UEs in association with identifying a set of resources for transmitting a signal should be defined.

Some aspects described herein provide techniques and apparatuses for selecting resources from one or more resource maps obtained from nearby devices. In some aspects, a first UE may receive a set of resource maps from one or more second UEs. Here, each resource map of the set of resource maps may include resource availability information for a respective time window. The first UE may select a set of resources based at least in part on at least one resource map of the set of resource maps, and may transmit a signal using the selected set of resources. Additional details are provided below. In some aspects, the techniques and apparatus described herein reduce overhead of resource map sharing when, for example, available resource maps are shared among UEs. Further, in some aspects, the techniques and apparatus described herein reduce resource collisions (i.e., simultaneously selection of the same resource) when, for example, unavailable resource maps are shared among UEs. Additionally, in some aspects, the techniques and apparatus described herein reduce overall complexity of resource map sharing in a wireless communication system.

Figure 3A:
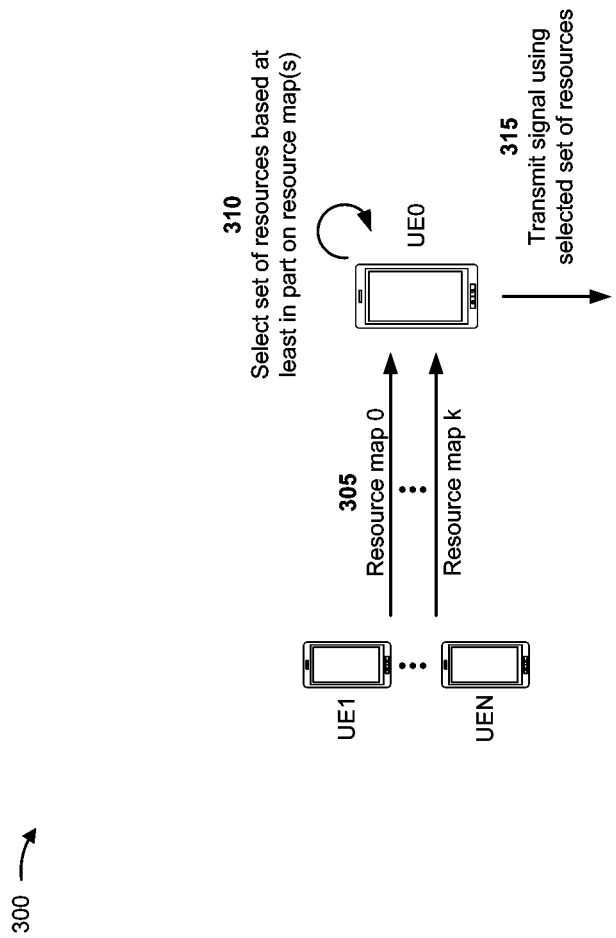
FIGS. 3A and 3B are diagrams illustrating examples associated with selecting resources from resource maps obtained from nearby devices, in accordance with various aspects of the present disclosure.
Figure 3B:
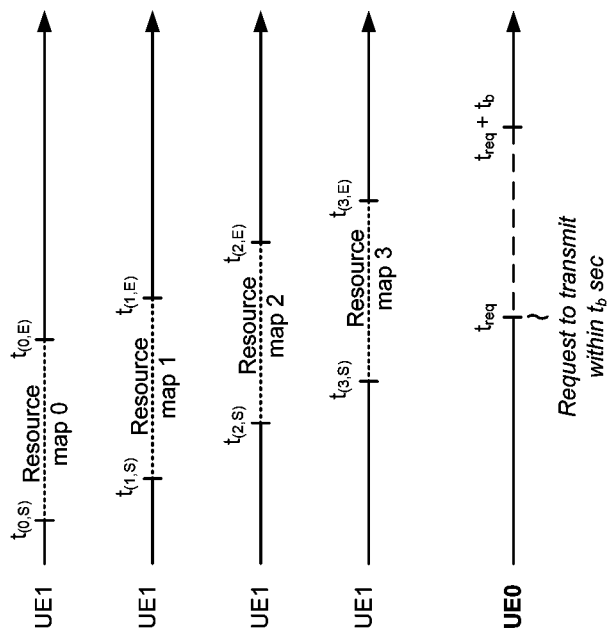

FIGS. 3A and 3B are diagrams illustrating examples associated with selecting resources from a resource map obtained from one or more nearby devices, in accordance with various aspects of the present disclosure.

As shown by reference 305 in FIG. 3A, a first UE (e.g., a first UE 120, identified as UE0) may receive a set of resource maps (e.g., resource map 0 through resource map k (k≥1)) from one or more second UEs (e.g., one or more seconds UE 120, identified as UE1 through UEN (N≥1) in FIG. 3A). In some aspects, as described above, a given UE of the one or more second UEs may determine a given resource map, of the set of the resource maps, based at least in part on sensing performed by the given UE, based at least in part on control information received by the given UE, based at least in part on identifying repetitive transmissions by other wireless communication devices, based at least in part on another resource map received by the given UE, and/or the like.

In some aspects, each resource map of the set of resource maps includes resource availability information for a respective time window. For example, with reference to FIG. 3B and with respect to resource maps provided by a particular one of one or more second UEs (UE1), a first resource map (resource map 0) of the set of resource maps may identify one or more available resources and/or one or more unavailable resources in a first time window with a start at time $t_{(0,S)}$ and an end at time $t_{(0,E)}$, while a second resource map (resource map 1) of the set of resource maps May identify one or more available resources and/or one or more unavailable resources in a second time window with a start at time $t_{(1,S)}$ and an end at time $t_{(1,E)}$, and so on. In some aspects, as indicated in FIG. 3B, time windows of two or more of the set of resource maps may overlap, meaning that the corresponding two or more resource maps may overlap. In some aspects, two or more resource maps of the set of resource maps may overlap in frequency and/or in time.

In some aspects, the first UE may receive the set of resource maps on a periodic basis or based at least in part on a configuration of the one or more second UEs. For example, the one or more second UEs may be configured to determine and provide a resource map to the first UE at a first time, and to determine and provide a another (e.g., updated) resource map to the first UE at a second time that is a particular amount of time after the first time. Thus, in some aspects, the first UE may receive the set of resource maps from the one or more second UEs automatically on a periodic basis. In some aspects, the first UE may receive one or more resource maps based at least in part on requesting the one or more resource maps from the one or more second UEs.

As shown by reference 310 in FIG. 3A, the first UE may select a set of resources based at least in part on at least one resource map of the set of resource maps. In some aspects, the first UE may select the set of resources further based at least in part on a transmission time threshold. In some aspects, the transmission time threshold is a time by which a signal is to be transmitted by the first UE. For example, with reference to FIG. 3B, the transmission time threshold is a point in time corresponding to a time of receipt of a request to transmit a signal (identified as time $t_{req}$) plus a budget time (identified as $t_b$). Therefore, in the example shown in FIG. 3B, the transmission time threshold is defined by time $t_{req}+t_b$.

In some aspects, the first UE may select the set of resources based at least in part on determining that the first UE is to transmit a signal. For example, the first UE may receive (e.g., from one of the second UEs, from a base station 110, from another UE 120, and/or the like) a request to transmit a signal, such as an uplink communication, a sidelink communication, a reference signal, or another type of communication. In some aspects, the request may indicate that the signal is to be transmitted in accordance with the transmission time threshold. In some aspects, the transmission time threshold may be identified in the request. Alternatively, in some aspects, the transmission time threshold may be configured on the first UE. In some aspects, the first UE may be configured to transmit a given signal in accordance with a transmission time threshold configured on the first UE, meaning that, in some aspects, neither the indication to transmit the signal in accordance with the transmission time threshold or information that identifies the transmission time threshold are included in the request to transmit the signal.

In some aspects, the first UE may select the set of resources based at least in part on one or more resource maps, of the set of resource maps, that include information that identifies available resources.

For example, the first UE may receive one or more resource maps that identify available resources and may receive the request to transmit the signal. In this example, the first UE may determine whether the time of receipt of the request to transmit the signal is after an end of a time window associated with a freshest resource map (e.g., a most recently received resource map, a resource map having a latest ending time window, and/or the like). Here, if the time of receipt of the request to transmit the signal is after the end of the time window associated with the freshest resource map, then the first UE may determine whether a resource map is received within a threshold amount of time from receipt of the request. Put another way, the first UE may wait for a threshold amount of time after receipt of the request to receive another resource map. Here, if the first UE does not receive another resource map within the threshold amount of time from receipt of the request, then the first UE may randomly select the set of resources. Here, the first UE may randomly select the set of resources such that the first UE can transmit the signal in accordance with the transmission time threshold.

Continuing with the above example, if the time of receipt of the request to transmit the signal is not after the end of the time window associated with the freshest resource map, then the first UE may select the set of resources based at least in part on a particular resource map of the set of resource maps, in some aspects. For example, the first UE may identify a particular resource map, of the set of resource maps, associated with a time window having a latest start time that is before the receipt time of the request to transmit the signal and an end time that is after the receipt time of the request. In some aspects, the particular resource map identified by the UE may be the freshest resource map. The first UE may then select the set of resources based at least in part on the particular resource map. Put another way, in some aspects, the first UE may identify a particular resource map (e.g., the freshest resource map) based at least in part on which to select the set of resources, and may select the set of resources based at least in part on the particular resource map. In some aspects, the UE may select the set of resources from a particular resource map of the set of resource maps when the first UE is configured such that the UE does not combine the set of resource maps that identify available resources.

As an alternative example, if the time of receipt of the request to transmit the signal is not after the end of the time window associated with the freshest resource map, then the first UE may select the set of resources based at least in part on a combined resource map, in some aspects. For example, in some aspects, the UE may be configured such that the UE combines the set of resource maps that identify available resources (e.g., to create a combined resource map that identifies available resources). Here, the first UE may determine whether the transmission time threshold is at or before an end time associated with the combined resource map. In some aspects, if the transmission time threshold is at or before the end time associated with the combined resource map, then the first UE may select the set of resources based at least in part on the combined resource map. Alternatively, in some aspects, if the transmission time threshold is after the end time associated with the combined resource map, then the first UE may select at least a subset of the resources, of the set of resources, from the combined resource map. Here, if additional resources are needed (e.g., if available resources indicated by the combined resource map are not sufficient to transmit the signal) then the UE may randomly select another subset of resources (e.g., a subset of resources that is after the end time of the combined resource map). In these examples, the set of resources may be selected such that the first UE can transmit the signal in accordance with the transmission time threshold.

In some aspects, the first UE may select the set of resources based at least in part on one or more resource maps, of the set of resource maps, that include information that identifies unavailable resources.

For example, the first UE may receive one or more resource maps that identify unavailable resources, and may receive the request to transmit the signal. In this example, the first UE may determine whether a receipt time of the request to transmit the signal is after an end of a time window of a freshest resource map of the set of resource maps. Here, if the receipt time of the request is after the end of the time window of the freshest resource map, then the first UE may randomly select the set of resources. Here, the first UE may randomly select the set of resources such that the first UE can transmit the signal in accordance with the transmission time threshold.

Continuing with the above example, if the time of receipt of the request to transmit the signal is not after the end of the time window associated with the freshest resource map, then the first UE may, in some aspects, combine the set of resource maps to generate a combined resource map that identifies unavailable resources, and may randomly select the set of resources based at least in part on the combined resource map. That is, the first UE may randomly select the set of resources from resources that are not identified as unavailable by the combined resource map.

Notably, the above-described aspects can be applied in cases in which one or more resource maps in the set of resource maps do not include location information associated with UEs that provided the respective resource maps, or cases in which the first UE is configured not to take location information into account when selecting the set of resources.

In some aspects, each resource map of the set of resource maps may include location information associated with a UE of the one or more second UEs. That is, in some aspects, each of the set of resource maps may include information that identifies a location of a UE that determined the resource map. The location information may include, for example, information that identifies an absolute location of the UE (e.g., a set of coordinates), a relative location (e.g., with respect to a reference location, with respect to the first UE), and/or the like.

In some aspects, when the set of resource maps includes location information associated with the one or more second UEs and the set of resource maps identifies available resources, the first UE may select the set of resources based at least in part on a freshest resource map associated with a closest UE. For example, the first UE may identify, based at least in part on the location information, a closest UE of the one or more second UEs (e.g., a UE of the one or more second UEs that is closest to the first UE). Next, the first UE may identify a freshest resource map, of the set of resource maps, associated with the closest UE. The first UE may then select the set of resources based at least in part on the freshest resource map associated with the closest UE. In this way, the first UE may be configured to utilize a most recent resource map associated with a closest UE.

In some aspects, when the set of resource maps includes location information associated with the one or more second UEs and the set of resource maps identifies available resources, the first UE may select the set of resources based at least in part on a combined resource map associated with the closest UE. For example, the first UE may identify, based at least in part on the location information, the closest UE of the one or more second UEs. Next, the first UE may identify a subset of resource maps, of the set of resource maps, associated with the closest UE, and may combine the subset of resource maps to generate a combined resource map associated with the closest UE. The first UE may then select the set of resources based at least in part on the combined resource map associated with the closest UE. In this way, the first UE may be configured to utilize resource maps associated with a closest UE (and combine them across time).

In some aspects, when the set of resource maps includes location information associated with the one or more second UEs and the set of resource maps identifies available resources, the first UE may select the set of resources based at least in part on a freshest resource map associated with a UE that is within a threshold distance of the first UE. For example, the first UE may identify, based at least in part on the location information, a UE of the one or more second UEs that is within a threshold distance of the first UE. Next, the first UE may identify a freshest resource map, of the set of resource maps, associated with the UE that is within the threshold distance. The first UE may then select the set of resources based at least in part on the freshest resource map associated with the UE within the threshold distance. In some aspects, when two or more of the second UEs, are within the threshold distance, the first UE may select on of the two or more second UEs (e.g., based at least in part on freshness of resource maps associated with the two or more second UEs), and may proceed accordingly.

In some aspects, when the set of resource maps includes location information associated with the one or more second UEs and the set of resource maps identifies available resources, the first UE may select the set of resources based at least in part on a combined resource map associated with one or more UEs within a threshold distance of the first. For example, the first UE may identify, based at least in part on the location information, one or more of the second UEs that are within the threshold distance of the first UE. Next, the first UE may identify a subset of resource maps, of the set of resource maps, associated with the one or more UEs within the threshold distance (e.g., a freshest resource map associated with each of the one or more UEs, a last two resource maps associated with each of the one or more UEs, all resource maps associated with each of the one or more UEs, and/or), and may combine the subset of resource maps to generate a combined resource map associated with the one or more UEs. The first UE may then select the set of resources based at least in part on the combined resource map associated with the one or more UEs within the threshold distance of the first UE.

In some aspects, when the set of resource maps includes location information associated with the one or more second UEs and the set of resource maps identifies unavailable resources, the first UE may select the set of resources based at least in part on a combined resource map. For example, the first UE may combine the set of resource maps to generate a combined resource map that identifies unavailable resources. Next, the first UE may identify available resources from the combined resource map (e.g., by identifying resources that are not indicated as unavailable). The first UE may then select the set of resources based at least in part on the combined resource map. In this way, the first UE may utilize all available resource maps and identify all available resources from all of the available resource maps.

In some aspects, when the set of resource maps includes location information associated with the one or more second UEs and the set of resource maps identifies unavailable resources, the first UE may select the set of resources based at least in part on a freshest resource map. For example, the first UE may identify a freshest resource map of the set of resource maps, and may identify available resources based at least in part on the freshest resource map (e.g., by identifying resources that are not indicated as unavailable). The first UE may then select the set of resources from the identified available resources. In this way, the first UE may utilize a freshest resource map and identify all available resources from the freshest resource map.

In some aspects, the first UE may select the set of resources based at least in part on sensing performed by the first UE. For example, in some aspects, the first UE may combine incorporate a result of sensing performed by the first UE with the set of resource maps such that the creates another resource map, and may select the set of resources accordingly.

As shown by reference 315, the first UE may transmit the signal using the one or more selected resources. For example, after selecting the set of resources in the manner described above, the first UE may transmit the signal.

As indicated above, FIGS. 3A and 3B are provided as examples. Other examples may differ from what is described with respect to FIGS. 3A and 3B. For example, while FIGS. 3A and 3B show an example of a single second UE providing a set of resource maps to a single first UE, in another example, two or more second UEs (e.g., multiple second UEs) may provide a set of resource maps to two or more first UEs (e.g., multiple first UEs) such that the two or more first UEs can select sets of resources for transmitting respective signals.

FIG. 4 is a diagram illustrating an example process 400 performed, for example, by a first UE, in accordance with various aspects of the present disclosure. Example process 400 is an example where the first UE (e.g., a UE 120 and/or the like) performs operations associated with selecting resources from resource maps obtained from one or more nearby devices.

As shown in FIG. 4, in some aspects, process 400 may include receiving a set of resource maps from one or more second UEs, each resource map of the set of resource maps including resource availability information for a respective time window (block 410). For example, the first UE (e.g., using receive processor 258, transmit processor 264, controller/processor 280, memory 282, and/or the like) may receive a set of resource maps from one or more second UEs (e.g., one or more other UEs 120), each resource map of the set of resource maps including resource availability information for a respective time window, as described above.

As further shown in FIG. 4, in some aspects, process 400 may include selecting a set of resources based at least in part on at least one resource map of the set of resource maps (block 420). For example, the first UE (e.g., using receive processor 258, transmit processor 264, controller/processor 280, memory 282, and/or the like) may select a set of resources based at least in part on at least one resource map of the set of resource maps, as described above.

As further shown in FIG. 4, in some aspects, process 400 may include transmitting a signal using the selected set of resources (block 430). For example, the first UE (e.g., using receive processor 258, transmit processor 264, controller/processor 280, memory 282, and/or the like) may transmit a signal using the selected set of resources, as described above.

Process 400 may include additional aspects, such as any single aspect or any combination of aspects described below and/or in connection with one or more other processes described elsewhere herein.

In a first aspect, process 400 includes receiving a request to transmit the signal, the request indicating that the signal is to be transmitted in accordance with the transmission time threshold.

In a second aspect, alone or in combination with the first aspect, the at least one resource map of the set of resource maps includes information that identifies available resources.

In a third aspect, alone or in combination with one or more of the first and second aspects, selecting the set of resources includes determining that no resource map has been received within a threshold amount of time from receipt of a freshest resource map of the set of resource maps; determining that a receipt time of a request to transmit the signal is after an end of a time window associated with the freshest resource map, and randomly selecting the set of resources based at least in part on the determination that no resource map has been received within the threshold amount of time and the determination that the receipt time of the request is after the end of the time window associated with the freshest resource map.

In a fourth aspect, alone or in combination with one or more of the first through third aspects, selecting the set of resources includes a particular resource map, of the set of resource maps, associated with a time window having: a latest start time that is before a receipt time of a request to transmit the signal, and an end time that is after the receipt time of the request, and selecting the set of resources based at least in part on the particular resource map.

In a fifth aspect, alone or in combination with one or more of the first through fourth aspects, the set of resource maps includes a plurality of resource maps, process 400 further includes combining the plurality of resource maps to generate a combined resource map, the combined resource map identifying available resources.

In a sixth aspect, alone or in combination with one or more of the first through fifth aspects, selecting the set of resources includes determining that the transmission time threshold is before an end time associated with the combined resource map, and selecting the set of resources based at least in part on the combined resource map.

In a seventh aspect, alone or in combination with one or more of the first through sixth aspects, selecting the set of resources includes determining that the transmission time threshold is after an end time associated with the combined resource map, and selecting at least a subset of the resources, of the set of resources, from the combined resource map based at least in part on the determination that the transmission time threshold is after the end time associated with the combined resource map.

In an eighth aspect, alone or in combination with one or more of the first through seventh aspects, selecting the set of resources further comprises randomly selecting another subset of resources, of the set of resources, based at least in part on the determination that the transmission time threshold is after the end time associated with the combined resource map.

In a ninth aspect, alone or in combination with one or more of the first through eighth aspects, at least one resource map of the set of resource maps includes information that identifies unavailable resources.

In a tenth aspect, alone or in combination with one or more of the first through ninth aspects, selecting the set of resources includes determining that a receipt time of a request to transmit the signal is after an end of a time window of a freshest resource map of the set of resource maps, and randomly selecting the set of resources based at least in part on the determination that the receipt time of the request is after the end of the time window of the freshest resource map.

In an eleventh aspect, alone or in combination with one or more of the first through tenth aspects, the set of resource maps includes a plurality of resource maps, selecting the set of resources includes combining the plurality of resource maps to generate a combined resource map that identifies unavailable resources; determining that the transmission time threshold is before an end time associated with the combined resource map, and randomly selecting the set of resources based at least in part on the combined resource map.

In a twelfth aspect, alone or in combination with one or more of the first through eleventh aspects, each resource map of the set of resource maps includes location information associated with a UE of the one or more second UEs.

In a thirteenth aspect, alone or in combination with one or more of the first through twelfth aspects, the set of resource maps identify available resources, and selecting the set of resources includes identifying, based at least in part on the location information, a closest UE of the one or more second UEs; identifying a freshest resource map, of the set of resource maps, associated with the closest UE, and selecting the set of resources based at least in part on the freshest resource map associated with the closest UE.

In a fourteenth aspect, alone or in combination with one or more of the first through thirteenth aspects, the set of resource maps identify available resources, and selecting the set of resources includes identifying, based at least in part on the location information, a closest UE of the one or more second UEs; identifying a subset of resource maps, of the set of resource maps, associated with the closest UE; combining the subset of resource maps to generate a combined resource map associated with the closest UE, and selecting the set of resources based at least in part on the combined resource map associated with the closest UE.

In a fifteenth aspect, alone or in combination with one or more of the first through fourteenth aspects, the set of resource maps identify unavailable resources, and selecting the set of resources includes combining the set of resource maps to generate a combined resource map; identifying available resources from the combined resource map, and selecting the set of resources based at least in part on the combined resource map.

In a sixteenth aspect, alone or in combination with one or more of the first through fifteenth aspects, the set of resource maps identify unavailable resources, and selecting the set of resources includes identifying a freshest resource map of the set of resource maps; identifying available resources based at least in part on the freshest resource map, and selecting the set of resources from the identified available resources.

In a seventeenth aspect, alone or in combination with one or more of the first through sixteenth aspects, the set of resources is selected further based at least in part on sensing performed by the first UE.

In an eighteenth aspect, alone or in combination with one or more of the first through seventeenth aspects, the selection of the set of resources is further based at least in part on a transmission time threshold.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
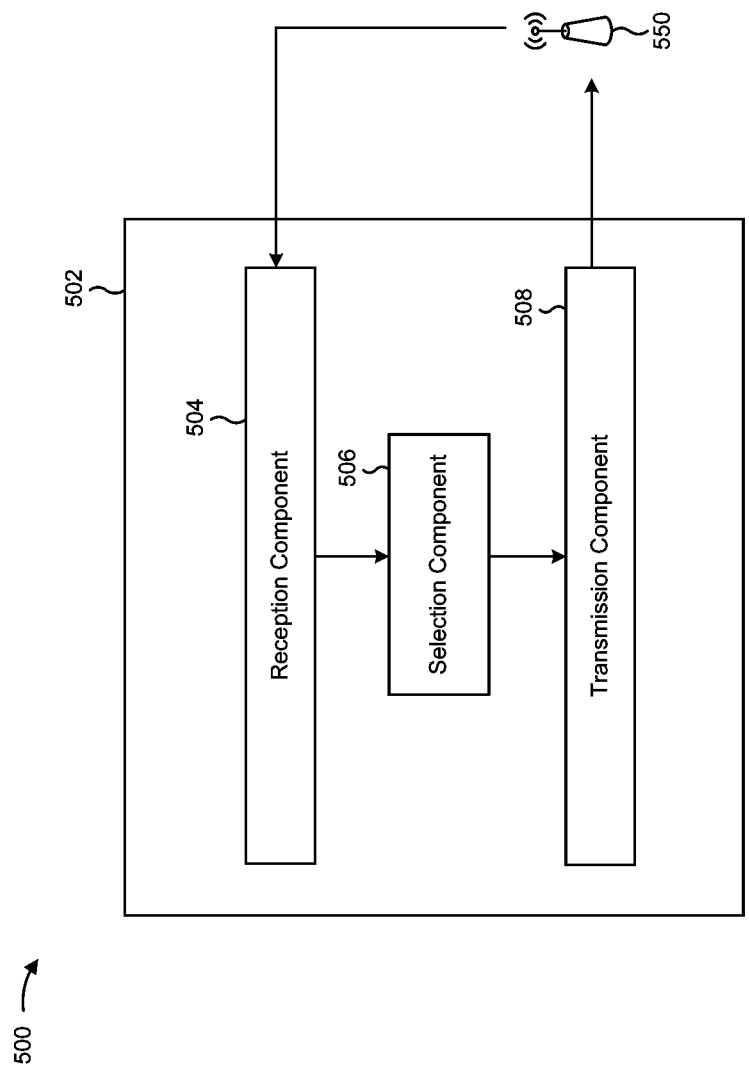
FIG. 5 is a conceptual data flow diagram illustrating the data flow between different components in an example apparatus, in accordance with various aspects of the present disclosure.

FIG. 5 is a conceptual data flow diagram 500 illustrating the data flow between different components in an example apparatus 502. The apparatus 502 may be a first UE (e.g., a first UE 120). In some aspects, the apparatus 502 includes a reception component 504, a selection component 506, and/or a transmission component 508. In some aspects, the apparatus 502 may communicate with a wireless communication device 550 (e.g., a second UE 120, a BS 110, or the like).

In some aspects, reception component 504 may receive a set of resource maps from one or more second UEs (e.g., one or more second UEs 120). In some aspects, resource map of the set of resource maps may include resource availability information for a respective time window. Selection component 506 may select a set of resources based at least in part on at least one resource map of the set of resource maps. Transmission component 508 may transmit a signal using the selected set of resources.

The apparatus may include additional components that perform each of the blocks of the algorithm in the aforementioned process 400 of FIG. 4 and/or the like. Each block in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of components (e.g., one or more components) shown in FIG. 5 may perform one or more functions described as being performed by another set of components shown in FIG. 5.

The following provides an overview of some Aspects of the present disclosure:

Aspect 1: A method of wireless communication performed by a first user equipment (UE), comprising: receiving a set of resource maps from one or more second UEs, each resource map of the set of resource maps including resource availability information for a respective time window; selecting a set of resources based at least in part on at least one resource map of the set of resource maps; and transmitting a signal using the selected set of resources.

Aspect 2: The method of Aspect 1, wherein the selection of the set of resources is further based at least in part on a transmission time threshold.

Aspect 3: The method of any of Aspects 1-2, further comprising receiving a request to transmit the signal, the request indicating that the signal is to be transmitted in accordance with a transmission time threshold.

Aspect 4: The method of any of Aspects 1-3, wherein the at least one resource map of the set of resource maps includes information that identifies available resources.

Aspect 5: The method of any of Aspects 1-4, wherein selecting the set of resources comprises: determining that no resource map has been received within a threshold amount of time from receipt of a freshest resource map of the set of resource maps; determining that a receipt time of a request to transmit the signal is after an end of a time window associated with the freshest resource map; and randomly selecting the set of resources based at least in part on the determination that no resource map has been received within the threshold amount of time and the determination that the receipt time of the request is after the end of the time window associated with the freshest resource map.

Aspect 6: The method of any of Aspects 1-5, wherein selecting the set of resources comprises: identifying a particular resource map, of the set of resource maps, associated with a time window having: a latest start time that is before a receipt time of a request to transmit the signal, and an end time that is after the receipt time of the request; and selecting the set of resources based at least in part on the particular resource map.

Aspect 7: The method of any of Aspects 1-6, wherein the set of resource maps includes a plurality of resource maps, wherein the method further comprises: combining the plurality of resource maps to generate a combined resource map, the combined resource map identifying available resources.

Aspect 8: The method of Aspect 7, wherein selecting the set of resources comprises: determining that a transmission time threshold is before an end time associated with the combined resource map; and selecting the set of resources based at least in part on the combined resource map.

Aspect 9: The method of Aspect 7, wherein selecting the set of resources comprises: determining that a transmission time threshold is after an end time associated with the combined resource map; and selecting at least a subset of the resources, of the set of resources, from the combined resource map based at least in part on the determination that the transmission time threshold is after the end time associated with the combined resource map.

Aspect 10: The method of Aspect 9, wherein selecting the set of resources further comprises: randomly selecting another subset of resources, of the set of resources, based at least in part on the determination that the transmission time threshold is after the end time associated with the combined resource map.

Aspect 11: The method of any of Aspects 1-10, wherein at least one resource map of the set of resource maps includes information that identifies unavailable resources.

Aspect 12: The method of any of Aspects 1-11, wherein selecting the set of resources comprises: determining that a receipt time of a request to transmit the signal is after an end of a time window of a freshest resource map of the set of resource maps; and randomly selecting the set of resources based at least in part on the determination that the receipt time of the request is after the end of the time window of the freshest resource map.

Aspect 13: The method of any of Aspects 1-12, wherein the set of resource maps includes a plurality of resource maps, wherein selecting the set of resources comprises: combining the plurality of resource maps to generate a combined resource map that identifies unavailable resources; determining that a transmission time threshold is before an end time associated with the combined resource map; and randomly selecting the set of resources based at least in part on the combined resource map.

Aspect 14: The method of any of Aspects 1-13, wherein each resource map of the set of resource maps includes location information associated with a UE of the one or more second UEs.

Aspect 15: The method of Aspect 14, wherein the set of resource maps identify available resources, and wherein selecting the set of resources comprises: identifying, based at least in part on the location information, a closest UE of the one or more second UEs; identifying a freshest resource map, of the set of resource maps, associated with the closest UE; and selecting the set of resources based at least in part on the freshest resource map associated with the closest UE.

Aspect 16: The method of Aspect 14, wherein the set of resource maps identify available resources, and wherein selecting the set of resources comprises: identifying, based at least in part on the location information, a closest UE of the one or more second UEs; identifying a subset of resource maps, of the set of resource maps, associated with the closest UE; combining the subset of resource maps to generate a combined resource map associated with the closest UE; and selecting the set of resources based at least in part on the combined resource map associated with the closest UE.

Aspect 17: The method of Aspect 14, wherein the set of resource maps identify unavailable resources, and wherein selecting the set of resources comprises: combining the set of resource maps to generate a combined resource map; identifying available resources from the combined resource map; and selecting the set of resources based at least in part on the combined resource map.

Aspect 18: The method of Aspect 14, wherein the set of resource maps identify unavailable resources, and wherein selecting the set of resources comprises: identifying a freshest resource map of the set of resource maps; identifying available resources based at least in part on the freshest resource map; and selecting the set of resources from the identified available resources.

Aspect 19: The method of any of Aspects 1-18, wherein the set of resources is selected further based at least in part on sensing performed by the first UE.

Aspect 20: An apparatus for wireless communication at a device, comprising a processor; memory coupled with the processor; and instructions stored in the memory and executable by the processor to cause the apparatus to perform the method of one or more Aspects of Aspects 1-19.

Aspect 21: A device for wireless communication, comprising a memory and one or more processors coupled to the memory, the memory and the one or more processors configured to perform the method of one or more Aspects of Aspects 1-19.

Aspect 22: An apparatus for wireless communication, comprising at least one means for performing the method of one or more Aspects of Aspects 1-19.

Aspect 23: A non-transitory computer-readable medium storing code for wireless communication, the code comprising instructions executable by a processor to perform the method of one or more Aspects of Aspects 1-19.

Aspect 24: A non-transitory computer-readable medium storing a set of instructions for wireless communication, the set of instructions comprising one or more instructions that, when executed by one or more processors of a device, cause the device to perform the method of one or more Aspects of Aspects 1-19.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving a set of resource maps from one or more second UEs, each resource map of the set of resource maps including resource availability information for a respective time window;
   selecting a set of resources based at least in part on at least one resource map of the set of resource maps, and based at least in part on a receipt time, relative to the respective time window, of a request to transmit a signal, wherein the selection of resources comprises:
      determining that no resource map has been received within a threshold amount of time from receipt of a freshest resource map of the set of resource maps;
      determining that the receipt time of the request to transmit the signal is after an end of a time window associated with the freshest resource map; and
      randomly selecting the set of resources based at least in part on the determination that no resource map has been received within the threshold amount of time and the determination that the receipt time of the request is after the end of the time window associated with the freshest resource map; and
   transmitting the signal using the selected set of resources.

2. The method of claim 1, wherein the selection of the set of resources is further based at least in part on a transmission time threshold.

3. The method of claim 1, further comprising receiving the request to transmit the signal, the request indicating that the signal is to be transmitted in accordance with a transmission time threshold.

4. The method of claim 1, wherein the at least one resource map of the set of resource maps includes information that identifies available resources.

5. The method of claim 1, wherein selecting the set of resources comprises:
   identifying a particular resource map, of the set of resource maps, associated with a time window having:
      a latest start time that is before the receipt time of the request to transmit the signal, and
      an end time that is after the receipt time of the request; and
   selecting the set of resources based at least in part on the particular resource map.

6. The method of claim 1, wherein the set of resource maps includes a plurality of resource maps, wherein the method further comprises:
   combining the plurality of resource maps to generate a combined resource map, the combined resource map identifying available resources.

7. The method of claim 6, wherein selecting the set of resources comprises:
   determining that a transmission time threshold is before an end time associated with the combined resource map; and
   selecting the set of resources based at least in part on the combined resource map.

8. The method of claim 6, wherein selecting the set of resources comprises:

determining that a transmission time threshold is after an end time associated with the combined resource map; and selecting at least a subset of resources, of the set of resources, from the combined resource map based at least in part on the determination that the transmission time threshold is after the end time associated with the combined resource map.

9. The method of claim 8, wherein selecting the set of resources further comprises:

randomly selecting another subset of resources, of the set of resources, based at least in part on the determination that the transmission time threshold is after the end time associated with the combined resource map.

10. The method of claim 1, wherein at least one resource map of the set of resource maps includes information that identifies unavailable resources.

11. The method of claim 1, wherein selecting the set of resources comprises:

determining that the receipt time of the request to transmit the signal is after an end of a time window of a freshest resource map of the set of resource maps; and randomly selecting the set of resources based at least in part on the determination that the receipt time of the request is after the end of the time window of the freshest resource map.

12. The method of claim 1, wherein the set of resource maps includes a plurality of resource maps, wherein selecting the set of resources comprises:

combining the plurality of resource maps to generate a combined resource map that identifies unavailable resources;

determining that a transmission time threshold is before an end time associated with the combined resource map; and randomly selecting the set of resources based at least in part on the combined resource map.

13. The method of claim 1, wherein each resource map of the set of resource maps includes location information associated with a UE of the one or more second UEs.

14. The method of claim 13, wherein the set of resource maps identify available resources, and wherein selecting the set of resources comprises:

identifying, based at least in part on the location information, a closest UE of the one or more second UEs;

identifying a freshest resource map, of the set of resource maps, associated with the closest UE; and selecting the set of resources based at least in part on the freshest resource map associated with the closest UE.

15. The method of claim 13, wherein the set of resource maps identify available resources, and wherein selecting the set of resources comprises:

identifying, based at least in part on the location information, a closest UE of the one or more second UEs;

identifying a subset of resource maps, of the set of resource maps, associated with the closest UE;

combining the subset of resource maps to generate a combined resource map associated with the closest UE; and selecting the set of resources based at least in part on the combined resource map associated with the closest UE.

16. The method of claim 13, wherein the set of resource maps identify unavailable resources, and wherein selecting the set of resources comprises:

combining the set of resource maps to generate a combined resource map;

identifying available resources from the combined resource map; and selecting the set of resources based at least in part on the combined resource map.

17. The method of claim 13, wherein the set of resource maps identify unavailable resources, and wherein selecting the set of resources comprises:

identifying a freshest resource map of the set of resource maps;

identifying available resources based at least in part on the freshest resource map; and selecting the set of resources from the identified available resources.

18. The method of claim 1, wherein the set of resources is selected further based at least in part on sensing performed by the first UE.

19. A first user equipment (UE) for wireless communication, comprising:

one or more memories; and one or more processors coupled to the one or more memories, the one or more memories and the one or more processors configured to:

receive a set of resource maps from one or more second UEs, each resource map of the set of resource maps including resource availability information for a respective time window;

select a set of resources based at least in part on at least one resource map of the set of resource maps, and based at least in part on a receipt time, relative to the respective time window, of a request to transmit a signal, wherein select the set of resources comprises:

determine that no resource map has been received within a threshold amount of time from receipt of a freshest resource map of the set of resource maps;

determine that the receipt time of the request to transmit the signal is after an end of a time window associated with the freshest resource map; and randomly select the set of resources based at least in part on the determination that no resource map has been received within the threshold amount of time and the determination that the receipt time of the request is after the end of the time window associated with the freshest resource map; and transmit the signal using the selected set of resources.

20. The first UE of claim 19, wherein the at least one resource map of the set of resource maps includes information that identifies available resources.

21. The first UE of claim 19, wherein the one or more memories and the one or more processors, when selecting the set of resources, are configured to:

identify a particular resource map, of the set of resource maps, associated with a time window having:

a latest start time that is before the receipt time of the request to transmit the signal, and an end time that is after the receipt time of the request; and select the set of resources based at least in part on the particular resource map.

22. The first UE of claim 19, wherein the set of resource maps includes a plurality of resource maps, wherein the one or more memories and the one or more processors are further configured to:

combine the plurality of resource maps to generate a combined resource map, the combined resource map identifying available resources.

23. The first UE of claim 19, wherein at least one resource map of the set of resource maps includes information that identifies unavailable resources.

24. The first UE of claim 19, wherein the one or more memories and the one or more processors, when selecting the set of resources, are configured to:
 determine that the receipt time of the request to transmit the signal is after an end of a time window of a freshest resource map of the set of resource maps; and
 randomly select the set of resources based at least in part on the determination that the receipt time of the request is after the end of the time window of the freshest resource map.

25. The first UE of claim 19, wherein the set of resource maps includes a plurality of resource maps, wherein the one or more memories and the one or more processors, when selecting the set of resources, are configured to:
 combine the plurality of resource maps to generate a combined resource map that identifies unavailable resources;
 determine that a transmission time threshold is before an end time associated with the combined resource map; and
 randomly select the set of resources based at least in part on the combined resource map.

26. The first UE of claim 19, wherein each resource map of the set of resource maps includes location information associated with a UE of the one or more second UEs.

27. A non-transitory computer-readable medium storing one or more instructions for wireless communication, the one or more instructions comprising:
 one or more instructions that, when executed by one or more processors of a first user equipment (UE), cause the one or more processors to:
  receive a set of resource maps from one or more second UEs, each resource map of the set of resource maps including resource availability information for a respective time window;
  select a set of resources based at least in part on at least one resource map of the set of resource maps, and based at least in part on a receipt time, relative to the respective time window, of a request to transmit a signal, wherein select the set of resources comprises:
   determine that no resource map has been received within a threshold amount of time from receipt of a freshest resource map of the set of resource maps;
   determine that the receipt time of the request to transmit the signal is after an end of a time window associated with the freshest resource map; and
   randomly select the set of resources based at least in part on the determination that no resource map has been received within the threshold amount of time and the determination that the receipt time of the request is after the end of the time window associated with the freshest resource map; and
  transmit the signal using the selected set of resources.

28. An apparatus for wireless communication, comprising:
 means for receiving a set of resource maps from one or more user equipments (UEs), each resource map of the set of resource maps including resource availability information for a respective time window;
 means for selecting a set of resources based at least in part on at least one resource map of the set of resource maps and a transmission time threshold, and based at least in part on a receipt time, relative to the respective time window, of a request to transmit a signal, wherein select the set of resources comprises:
  determine that no resource map has been received within a threshold amount of time from receipt of a freshest resource map of the set of resource maps;
  determine that the receipt time of the request to transmit the signal is after an end of a time window associated with the freshest resource map; and
  randomly select the set of resources based at least in part on the determination that no resource map has been received within the threshold amount of time and the determination that the receipt time of the request is after the end of the time window associated with the freshest resource man; and
 means for transmitting the signal using the selected set of resources.

* * * * *